United States Patent [19]

Pemberton

[11] 3,727,035
[45] Apr. 10, 1973

[54] PULSE TEST OF DIGITAL CONTROL SYSTEM

[75] Inventor: Troy J. Pemberton, Bartlesville, Okla.

[73] Assignee: Phillips Petroleum Company, Bartlesville, Okla.

[22] Filed: June 3, 1971

[21] Appl. No.: 149,583

[52] U.S. Cl. .............................................235/150.1
[51] Int. Cl. .........................G06f 15/46, G05b 17/02
[58] Field of Search .........................235/150.1; 444/1

[56] References Cited

UNITED STATES PATENTS 3,621,217   11/1971   Carr et al. ..........................235/150.1

Primary Examiner—Eugene G. Botz
Attorney—Young and Quigg

[57] ABSTRACT

In a direct digital control system, a pulse test method is provided for computing data which can be employed to revise tuning coefficients used in the process model. On initiation of the test, the direct digital control operation is suspended and the controlled variable is pulsed. Revised tuning coefficients of the mathematical model defining the control loop are computed from detected changes in the measured variable. These coefficients can be inserted into the control loop model to provide more accurate process control.

3 Claims, 7 Drawing Figures

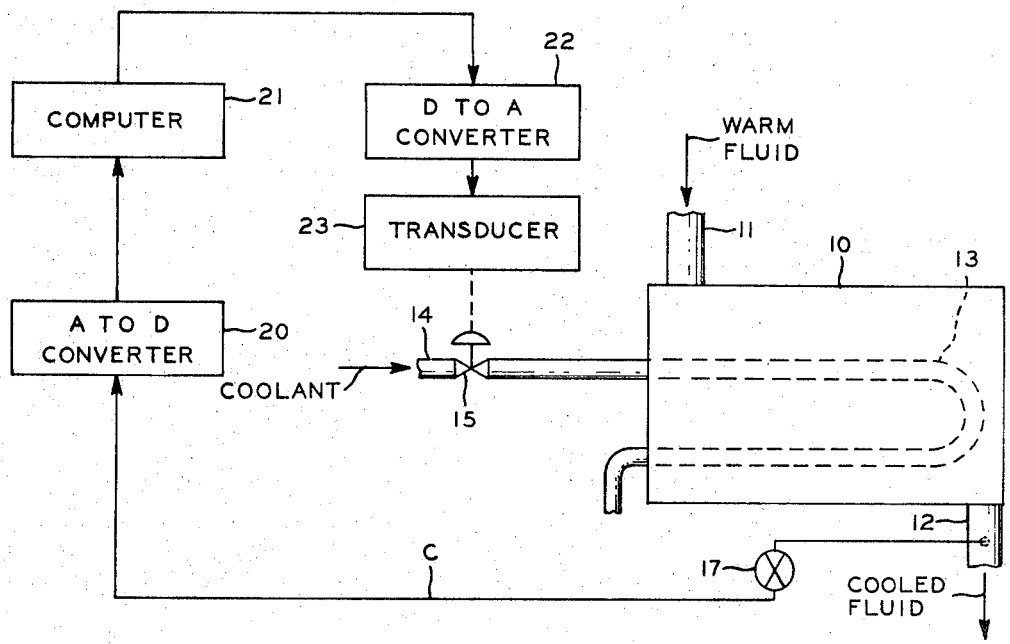
FIG. 1
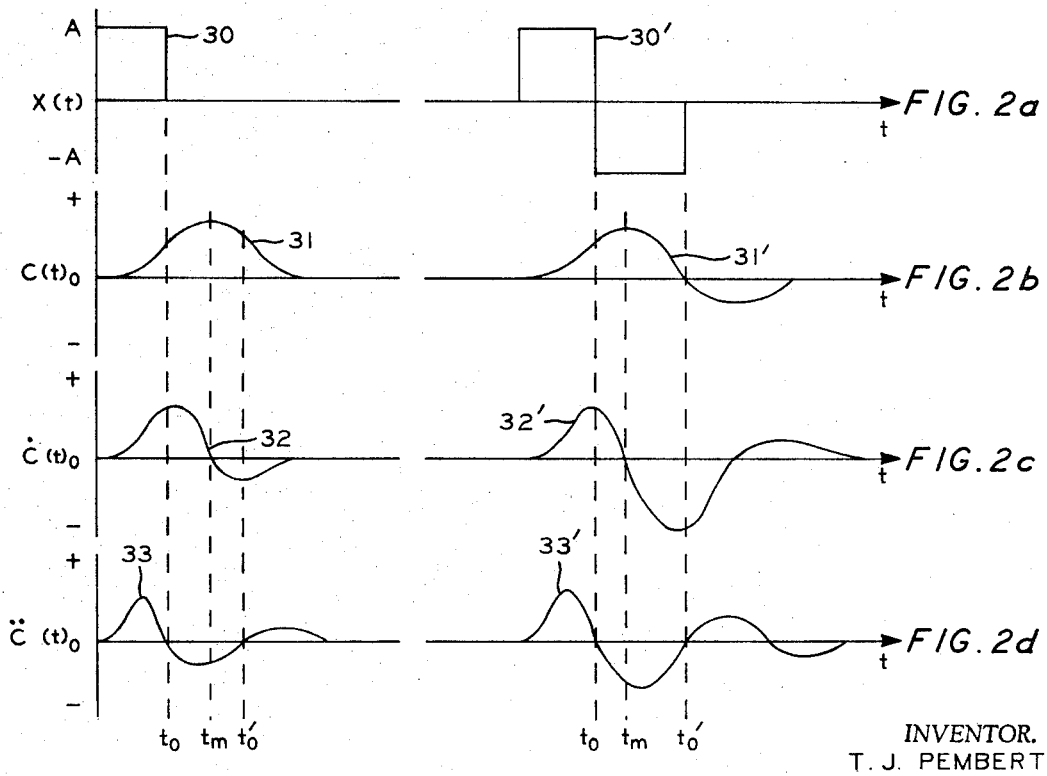
INVENTOR.
T. J. PEMBERTON
BY Young & Quigg
ATTORNEYS

INVENTOR.
T. J. PEMBERTON
BY Young & Quigg
ATTORNEYS

PULSE TEST OF DIGITAL CONTROL SYSTEM

Increasing use is being made of digital computers in automatic control operations. The use of high speed digital computers enables control systems to be realized which require relatively complex equations to describe the necessary control action. In order to design such automatic control systems it is necessary to establish mathematical models which correlate changes in input variables with the necessary control action to be performed. It has been found that many processes, particularly those in the chemical and petroleum industries, can be described to a close approximation by the transfer function $$(\text{Output/Input})(s) = Ke^{-\tau_d s}/(\tau_1 s+1)(\tau_2 s+1) \quad (1)$$

where $s$ is the Laplace operator and $K$, $\tau_d$, $\tau_1$ and $\tau_2$ are model parameter constants. This transfer function defines a model having second order lag plus dead time. The parameters $K$, $\tau_d$, $\tau_1$ and $\tau_2$ are established initially from a study of the effect that changes in process conditions have on a measured variable. The values of these parameters can be derived empirically by curve fitting procedures based on measured data.

Unfortunately, many processes change over a period of time so that the initially established parameters do not continue to describe the process accurately. For example, in a heat exchange process, the gradual accumulation of scale on heat exchange tubes can reduce the heat transfer properties of the tubes. In a chemical reaction, the activity of a catalyst may decrease over a period of time. In both of these examples, the necessary control equation must be changed with time.

This invention provides a system for computing updated parameters for mathematical models employed in automatic control processes. A controlled variable of the process is pulsed, and the first and second derivative of a measured variable are calculated following the application of the pulse. In response to these derivatives, calculations are made of updated parameters to be employed in an equation which defines the mathematical model of the control system. These revised parameters can be inserted into the control system automatically if desired.

In the accompanying drawing,

FIG. 1 is a schematic representation of a heat exchange system controlled by a direct digital control system.

FIGS. 2a to 2d are graphical representations of signals obtained in accordance with the process of this invention.

Figure 3:
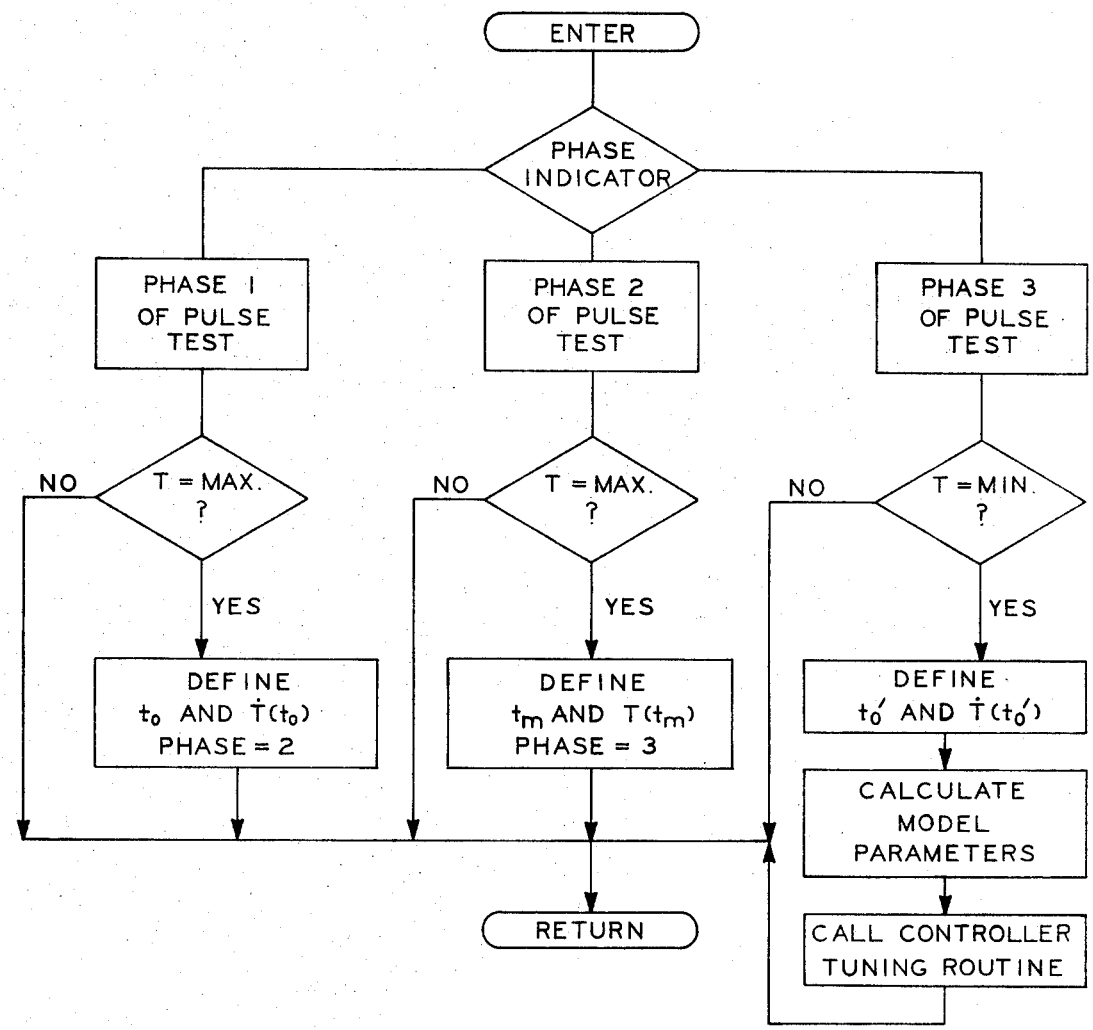
FIG. 3 is a logic flow diagram for a computer program employed in the pulsed system of this invention.

Referring now to the drawing in detail and to FIG. 1 in particular, there is shown a schematic representation of a heat exchange system. A warm fluid to be cooled is introduced into a heat exchange vessel 10 through an inlet conduit 11. Cooled fluid is removed through an outlet conduit 12. A coil 13 is disposed within vessel 10, and coolant is introduced into the coil through a conduit 14 which has a pneumatically operated control valve 15 therein. A temperature sensing element is disposed in conduit 12 to measure the temperature of the cooled fluid removed from vessel 10. A transmitter 17 is connected to the temperature sensing element to establish an output signal $c$ which is representative of the measured temperature. This signal, which is in analog form, is transmitted to the input of an analog-to-digital converter 20. A corresponding signal in digital form is transmitted to a digital computer 21. Computer 21 is programmed in accordance with a mathematical model which describes the operation of the control system. This computer establishes an output signal which represents any change which may be necessary in the rate of flow of coolant through coil 13 in order to maintain the cooled fluid at a desired temperature. The output signal from computer 21 is applied to a digital-to-analog converter 22 which establishes a corresponding output electrical signal. This signal is applied to a transducer 23 which establishes a pneumatic signal representative of the input electrical signal. The pneumatic signal is applied to regulate valve 15. If an electrical control valve is employed, transducer 23 can be eliminated.

The apparatus thus far described constitutes a conventional control loop utilizing a computer to regulate the setting of a controlled variable in response to changes in a measured variable. In one specific example which demonstrates the operation of the pulse test method of this invention, a heat exchange system of the type shown in FIG. 1 can be controlled when computer 21 is programmed in accordance with the following mathematical model:

$$\Delta M = K_p\{(P_2-C_2)-(P_1-C_1)+(\Delta T/\tau_I)(P_2-C_2)+(\tau_R/\Delta T)[(P_2-C_2)-2(P_1-C_1)+(P_o-C_o)]\} \quad (2)$$

$P_o$ = setpoint value 2 samples previous to $P_2$
$C_o$ = measured temp 2 samples previous to $C_2$ where $\Delta M$ is the incremental change in controller output, $K_p$ is the proportional gain of the algorithm, $\tau_I$ is reset time, $\tau_R$ is rate time, $p_2$ is the latest set point value, $p_1$ is the set point value one sample previous, $C_2$ is the measured temperature at the latest sample, and $C_1$ is the measured temperature one sample previous. The $C$ values can represent actual measured values or averages of several measured values. For example, $C_2$ can represent the average of the latest five measured values, and $C_1$ can represent the average of the five measured values immediately preceding the latest value.

The first step in the operation of this invention is to remove the automatic control from the system. An input signal can be introduced into the computer for this purpose by an operator, or the computer can be programmed to perform the pulse test periodically. After automatic control is removed, a pulsed output signal from the computer is generated. This can be in the form of a rectangular pulse 30 of amplitude A, as illustrated in FIG. 2a. Such a pulse changes the position of control valve 15 of FIG. 1 abruptly by an amount representative of amplitude A. The resulting change of flow of coolant through coil 13 changes the temperature of the fluid being heated so that a temperature change is soon detected in outlet conduit 12. For example, if the pulse applied to valve 15 moves the valve toward a closed position, the measured temperature C tends to increase, as shown by the curve 31 of FIG. 2b. Curves 32 and 33 in FIGS. 2c and 2d represent the first ($\dot{c}$) and second ($\ddot{c}$) derivatives, respectively, of the curve 31 of FIG. 2b with respect to time. These derivatives are utilized in accordance with the present invention to compute new parameters for the analog model.

The mathematical model of Equation (1) can be expressed in the time domain $X(t)$ by the equation $$\tau_1\tau_2\ddot{c}(t) + (\tau_1+\tau_2)\dot{c}(t) + c(t) = KX(t-\tau_d) \quad (3)$$

where $\tau_1$ and $\tau_2$ are the major process time constants, $\tau_d$ is the apparent or true dead time, $K$ is the steady-state gain, and $t$ is time. As represented in FIG. 2a for a single-sided pulse 30, $$X(t) = A[U(t) - U(t-t_o)] \quad (4)$$

where $U(t)$ is 0 for $t \leq 0$ and is 1 for $t > 0$, and $U(t-t_o)$ is 0 for $t \leq t_o$ and is 1 for $t > t_o$. The time at which the pulse 30 is terminated is labeled $t_o$. This is the time at which $\dot{c}(t)$ is a maximum.

Equation (4) describes a rectangular pulse of magnitude A, beginning at $t$ equal zero and ending at $t$ equal $t_o$. By substituting Equation (4) into Equation (3), there is obtained the solution.

$$c_1(t) = KA\left[1 + \frac{a}{1-a} e^{\frac{-(t-\tau_d)}{\tau_1}} - \frac{1}{1-a} e^{\frac{-(t-\tau_d)}{\tau_2}}\right] U(t-\tau_d) \quad (5)$$

for $\tau_d < t \leq t_o$. The term $a$ is defined as the ratio $$a = \tau_1/\tau_2 \text{ and } 0 < a < 1. \quad (6)$$

For $t > t_o$, another term must be added to Equation (5):

$$c_2(t) = KA\left[1 + \frac{a}{1-a} e^{\frac{-(t-t_o-\tau_d)}{\tau_1}} - \frac{1}{1-a} e^{\frac{-(t-t_o-\tau_d)}{\tau_2}}\right] U(t-t_o-\tau_d) \quad (7)$$

By combining Equations (5) and (7) the entire solution is given as $$c(t) = c_1(t) - c_2(t) \quad (8)$$

Similarly $$\dot{c}_1(t) = \frac{\sqrt{aK}A}{1-a}\left[e^{\frac{-(t-\tau_d)}{\tau_2}} - e^{\frac{-(t-\tau_d)}{\tau_1}}\right] U(t-\tau_d) \quad (9)$$

and $$\dot{c}_2(t) = \frac{\sqrt{aK}A}{1-a}\left[e^{\frac{-(t-t_o-\tau_d)}{\tau_2}} - e^{\frac{-(t-t_o-\tau_d)}{\tau_1}}\right] U(t-t_o-\tau_d) \quad (10)$$

finally, $$\dot{c}(t) = \dot{c}_1(t) - \dot{c}_2(t) \quad (11)$$

Three different times during the test are important. These are $t_o$, $t_m$, and $t_o\alpha$. They are defined by the following:

$t_o \equiv t$ such that $\dot{c}(t_o) =$ a maximum
$t_m \equiv t$ such that $c(t_m) =$ a maximum
and
$t_o' \equiv t$ such that $\dot{c}(t_o') =$ a minimum Using these definitions along with Equations (8) and (11) there is obtained:

$$t_o = \tau_d = a\tau_2/(1-a) \ln a \quad (12)$$

$$t_m = \tau_d - \frac{a\tau_2}{1-a} \ln\left[\frac{1-a^{-\frac{a}{1-a}}e^{\frac{\tau_d}{\tau_2}}}{1-a^{-\frac{1}{1-a}}e^{\frac{\tau_d}{\tau_1}}}\right] \quad (13)$$

and $$t'_o = \tau_d - \frac{a\tau_2}{1-a} \ln\left[a\frac{1-a^{-\frac{a}{1-a}}e^{\frac{\tau_d}{\tau_2}}}{1-a^{-\frac{a}{1-a}}e^{\frac{\tau_d}{\tau_1}}}\right] \quad (14)$$

By substituting Equations (12) to (14) into Equations (8) and (11) there is obtained:

$$c(t_o) = KA + KA\left(\frac{a^{\frac{2-a}{1-a}} - a^{\frac{a}{1-a}}}{1-a}\right) \quad (15)$$

$$c(t_m) = -KA\frac{\left(1-a^{-\frac{a}{1-a}}e^{\frac{\tau_d}{\tau_2}}\right)^{\frac{1}{1-a}}}{\left(1-a^{-\frac{1}{1-a}}e^{\frac{\tau_d}{\tau_1}}\right)^{\frac{a}{1-a}}} \quad (16)$$

$$c(t'_o) = KA\frac{\left(1-a^{-\frac{a}{1-a}}e^{\frac{\tau_d}{\tau_2}}\right)^{\frac{1}{1-a}}}{\left(1-a^{-\frac{1}{1-a}}e^{\frac{\tau_d}{\tau_1}}\right)^{\frac{a}{1-a}}}\left(\frac{a^{\frac{2-a}{1-a}} - a^{\frac{a}{1-a}}}{1-a}\right) \quad (17)$$

$$\dot{c}(t_o) = \sqrt{aK}A\left(\frac{a^{\frac{a}{1-a}} - a^{\frac{1}{1-a}}}{1-a}\right) \quad (18)$$

and $$\dot{c}(t'_o) = \sqrt{aK}\,A\frac{\left(1-a^{-\frac{a}{1-a}}e^{\frac{\tau_d}{\tau_2}}\right)^{\frac{1}{1-a}}}{\left(1-a^{\frac{1}{1-a}}e^{\frac{\tau_d}{\tau_1}}\right)^{\frac{a}{1-a}}}\left(\frac{a^{\frac{a}{1-a}} - a^{\frac{1}{1-a}}}{1-a}\right) \quad (19)$$

Equations (12) to (19) form a set of eight equations in four unknowns, namely $K$, $\tau_1$, $\tau_2$, and $\tau_d$. The quantities $c(t_o)$, $c(t_m)$, $c(t_o')$, $\dot{c}(t_o)$, $\dot{c}(t_o')$, $t_o$, $t_m$, and $t_o'$ are observed during the execution of the pulse test, hence are available for use.

By appropriately combining Equations (15) to (17) a formula for $K$ is obtained:

$$K = \frac{1}{A}\frac{c(t_o)}{1-\frac{c(t'_o)}{c(t_m)}} \quad (20)$$

From Equations (16), (18) and (19) a different formula for $K$ is obtained:

$$K = -1/A\,[c(t_m)\,\dot{c}(t_o)/\dot{c}(t_o')] \quad (21)$$

Equations (12) to (14) can be combined to give $$\tau_d = t_o + t_m - t_o' \quad (22)$$

Two model parameters, $\tau_1$ and $\tau_2$, remain to be determined.

With the steady-state gain $K$ being determined by Equation (20) or (21), the ratio $a$ is now the only unknown in Equation (15). While it has not been possible to solve this equation analytically for $a$, a close approximation has been obtained by curve fitting. For practical purposes $a$ is given by $$a = 27 \, [c(t_o)/KA]^3 \qquad (23)$$

with $K$ and $a$ determined, Equation (12) can be used to compute $\tau_2$:

$$\tau_2 = [(t_o - \tau_d)(1-a)]/a \, \ln a \qquad (24)$$

By combining Equations (12) and (15) graphically to eliminate $a$, $\tau_2$ can be expressed as a function of the term $KA/c(t_o)$. For practical purposes the true curve is adequately described by the equation $$\tau_2 \cong [0.925 \, KA/c(t_o) - 2.3] \, [t_o' - t_m] \qquad (25)$$

Finally $$\tau_1 = a\tau_2 \cong 27 \, [\, c(t_o)/KA \,]^3 \tau_2 \qquad (26)$$

Equations (20) or (21), (22), (25) and (26) form a set of four formulas that can be used to compute directly from observed data a value for each of the model parameters. These equations can be solved by digital computer 21 of FIG. 1. A logic flow diagram of a suitable pulse test routine is illustrated in FIG. 3. At the beginning of the pulse test, an elapsed time counter within the computer is set to zero. Following computation of $\dot{c}$, the subsequent calculations can follow one of three branches depending on the particular index which has been set. Index No. 1 represents the time from the beginning of the test to $t_o$; Index No. 2 represents time from $t_o$ to $t_m$; and Index No. 3 represents the period of time from $t_m$ to $t_o'$. During Index No. 1, a determination is made of the maximum value of $\dot{c}$. At this time, the reading of an elapsed time counter represents $t_o$. The quantity $c(t_o)$ is set to the last sample value of $c$ and the quantity $\dot{c}(t_o)$ is set to the last calculated value of $\dot{c}$ and the pulse is removed. The index is then set to No. 2. If a two-sided pulse is employed, in the manner to be described, a reverse polarity pulse is then applied.

During Index No. 2, a determination is made of the time that $\dot{c}$ becomes equal to or less than zero. When this occurs, the reading of the elapsed time counter is representative of $t_m$ and $c(t_m)$ is set to last sample value of $c$. Index No. 3 is then set. During Index No. 3, a determination is made of the time at which $\dot{c}$ reaches a minimum. When this occurs, the reading of the elapsed time counter is representative of $t_o'$; $\dot{c}(t_o')$ and $c(t_o')$ are set to last determined values of $\dot{c}$ and $c$. At this time the computer calculates the values of $K$, $\tau_1$, $\tau_2$ and $\tau_d$ from the equations described above. This completes the pulse testing operation, and automatic process control by means of the computer is then restored.

As previously mentioned, a two-sided pulse 30' of the type illustrated in FIG. 2a can be employed in place of single sided pulse 30. This results in curves of the general configurations of the curves 31', 32' and 33' of FIGS. 2b, 2c and 2d. Corresponding equations can be derived to compute the parameters of the mathematical model. The two-sided pulse of FIG. 2a can be described by the equation:

$$x(t) = A \, [U(t) - 2U(t-t_o) + U(t-t_o')] \qquad (27)$$

Equations (5), (6), (7), (9), (12), (15) and (18) apply to this case without modification. However, before deriving the equations for $c(t_m)$, $c(t_o')$, $\dot{c}(t_o')$, $t_m$, and $t_o'$, a term must be modified in Equations (8) and (11). This yields $$c(t) = c_1(t) - 2c_2(t) \qquad (28)$$

and $$\dot{c}(t) = \dot{c}_1(t) - 2\dot{c}_2(t) \qquad (29)$$

With $t_o$, $t_m$, $t_o'$, and $\tau_d$ defined as before, $$t_m = \tau_d - \frac{a\tau_2}{1-a} \ln \left[ \frac{1 - 2a^{-\frac{a}{1-a}} e^{\frac{\tau_d}{\tau_2}}}{1 - 2a^{-\frac{1}{1-a}} e^{\frac{\tau_d}{\tau_1}}} \right] \qquad (30)$$

and $$t_o' = \tau_d - \frac{a\tau_2}{1-a} \ln \left[ \frac{a1 - 2a^{-\frac{a}{1-a}} e^{\frac{\tau_d}{\tau_2}}}{1 - 2a^{-\frac{1}{1-a}} e^{\frac{\tau_d}{\tau_1}}} \right] \qquad (31)$$

Upon substituting Equations (30) and (31) into (28) and (29) the following formulas are obtained:

$$c(t_m) = -KA - KA \frac{\left(1 - 2a^{-\frac{a}{1-a}} e^{\frac{\tau_d}{\tau_2}}\right)^{\frac{1}{1-a}}}{\left(1 - 2a^{\frac{1}{1-a}} e^{\frac{\tau_d}{\tau_1}}\right)^{\frac{a}{1-a}}} \qquad (32)$$

$$c(t_o') = -KA + KA \frac{\left(1 - 2a^{-\frac{a}{1-a}} e^{\frac{\tau_d}{\tau_2}}\right)^{\frac{1}{1-a}}}{\left(1 - 2a^{\frac{1}{1-a}} e^{\frac{\tau_d}{\tau_1}}\right)^{\frac{a}{1-a}}} \left( \frac{2-a}{a^{\frac{1}{1-a}}} - a^{\frac{a}{1-a}} \right) \qquad (33)$$

and $$\dot{c}(t_o') = \sqrt{a} KA \frac{\left(1 - 2a^{\frac{-a}{1-a}} e^{\frac{\tau_d}{\tau_2}}\right)^{\frac{1}{1-a}}}{\left(1 - 2a^{\frac{1}{1-a}} e^{\frac{\tau_d}{\tau_2}}\right)^{\frac{a}{1-a}}} \left( \frac{a^{\frac{1}{1-a}} - a^{\frac{1}{1-a}}}{1-a} \right) \qquad (34)$$

Equations (12), (15), (18) and (30) to (34) form a set of eight equations in the four unknown model parameters. As before, some of these equations may be combined. From Equations (15), (32) and (33)

$$K = \frac{1}{A} \frac{c(t_o)}{1 - \frac{c(t_o)}{c(t_m)} - \frac{c(t_o)}{c(t_m)}} \qquad (35)$$

from Equations (18), (32) and (34)

$$K = \frac{-1}{A} \frac{c(t_m)}{1 + \frac{\dot{c}(t_o')}{\dot{c}(t_o)}} \qquad (36)$$

By combining Equations (12), (30) and (31) the formula for $\tau_d$ is found to be $$\tau_d = t_o + t_m - t_o' \qquad (37)$$

(the same as for the single-sided pulse). The formulas for $\tau_1$ and $\tau_2$ are also the same for either type pulse. Therefore, changing the pulse from one-sided to two-sided affects only the formula for $K$.

With the parameters computed by the above-described equations, it is possible to compute new constants for the control algorithm of Equation (2). This can be accomplished by the following equations: I $$K_o = e^{-(.805 + 1.15a - 96a^2)} T_d^{-(1.323 - .048a + .0715 \ln T_d)} \qquad (38)$$

$$T_I = e^{-(.724 + .279a - 19a^2)} T_d^{-(.518 + .0108a + .0938 \ln T_d)} \qquad (39)$$

$$T_R = e^{-(1.4 - 3.08a + 3.12a^2)} T_d^{-(-.695 + .714a - .0065 \ln T_d)} \qquad (40)$$

where $K_p = K_o/K$; $\tau_I = T_I (\tau_2 + \tau_1 + \tau_d)$
$\tau_R = \tau R (\tau_2 + \tau_1 + \tau_d)$; $a = \tau_1/\tau_2$;
and $T_d = \tau_d/(\tau_1 + \tau_2 + \tau_d)$.

Equations (38), (39) and (40) are derived by the procedures described in Instrumentation Technology, February 1968, pages 65 to 70 and in a thesis entitled "Design of a Learning System for Bang-Bang Control of a Second Order Process with Variable Process Parameters," J. F. Steadman, Purdue University, January 1969. Equations (38), (39 ) and (40) can be solved by computer 21 immediately after the values of $K$, $\tau_1$, $\tau_2$ and $\tau_d$ are computed. The parameters so computed can then be inserted into the process control algorithm originally programmed into the computer to provide an updated algorithm. This results in an automatic self-tuning control system.

As an alternative, calculations can be made by less complex relationships as follows:

$$K_c = [2 (\tau_1 + \tau_2)]/3K\tau_d \qquad (41)$$

$$\tau_I = \tau_1 + \tau_2 ;$$

and $\qquad (42)$ $$\tau_R = \tau_1 \tau_2/(\tau_1 + \tau_2) \qquad (43)$$

Figure 4:
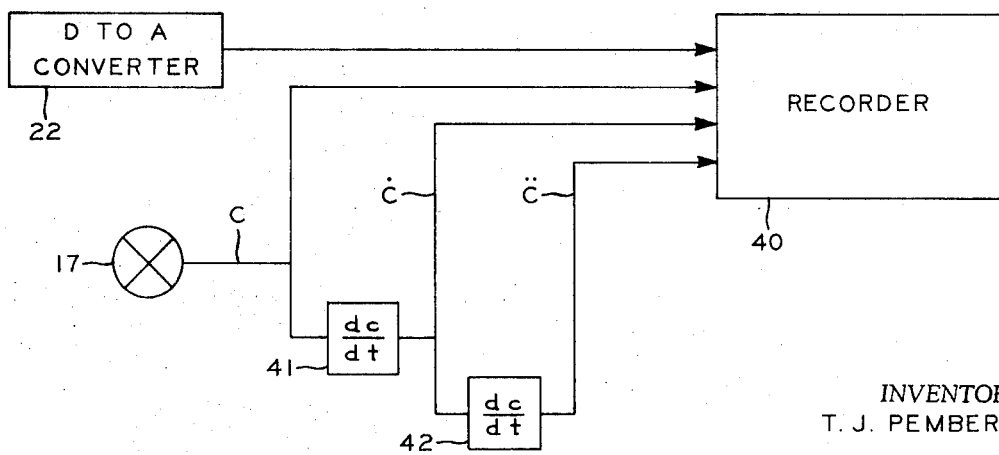
FIG. 4 is a schematic illustration of analog equipment which can be utilized to establish parameters of the mathematical model.

The calculations described above are advantageously made by programming computer 21 to carry out the operations of FIG. 3. This is usually the most practical procedure because the computer is available in the automatic control system being tested. However, it is not necessary to use a digital computer for this operation. The apparatus illustrated in FIG. 4 can be employed to establish signals which provide the necessary information to make the computations. The analog signal from converter 22 can be applied to the first channel of a conventional recorder 40. This establishes a signal of the type illustrated in FIG. 2a. The output signal $c$ from transducer 17 is applied to a second channel of recorder 40 to provide a signal corresponding to that shown in FIG. 2b. Signal c is also applied to the input of a differentiating circuit 41, the output of which is representative of $\dot{c}$. Signal $\dot{c}$ is applied to the input of a second differentiating circuit 42. Signals $\dot{c}$ and $\ddot{c}$ from circuits 41 and 42 are applied to respective third and fourth channels of recorder 40. These signals correspond to those shown in FIGS. 2c and 2d.

The data necessary to solve equations (20) or (21), (22), (25) and (26) can be obtained directly from the recorded signals on recorder 40. These data permit the calculations to be made manually if desired. The updated parameters can then be inserted into computer 21 when automatic control is restored.

While this invention has been described in conjunction with presently preferred embodiments, it obviously is not limited thereto.

What is claimed is:

1. In a process in which a process variable is manipulated by a control means in response to a measurement of a process condition in accordance with a mathematical model in the time domain $X(t)$ which is representative of the expression $$\tau_1\tau_2 \ddot{c}(t) + (\tau_1 + \tau_2) \dot{c}(t) + c(t) = KX(t - \tau_d)$$

where $t$ is time, $c$ is said measurement, $\dot{c}$ is the first derivative of $c$ with respect to time, $\ddot{c}$ is the second derivative of $c$ with respect to time, $\tau_1$ and $\tau_2$ are time constants, $\tau_d$ is dead time, and $K$ is a constant; the method of obtaining data which can be employed to revise the mathematical model to compensate for changes in the process, which method comprises:

removing the control means from control of the process;

applying a pulse of preselected amplitude to said process variable to cause a change in said process condition;

measuring said process condition and establishing a first signal representative thereof;

establishing a second signal which is representative of the first derivative of said first signal with respect to time;

removing said pulse from said process variable when said second signal reaches a maximum value; and establishing a third signal which is representative of the second derivative of said first signal with respect to time, said established signals providing information which can be employed to update said mathematical model.

2. The method of claim 1, further comprising applying a second pulse of polarity opposite the polarity of said first pulse to said process variable at the time the first mentioned pulse is removed, and removing said second pulse when said second signal reaches a minimum value.

3. The method of claim 1, further comprising computing constants for said mathematical model from said established signals.

* * * * *